Feb. 16, 1960    P. C. EFROMSON    2,925,503
VIBRATION TEST APPARATUS
Filed March 6, 1956    2 Sheets-Sheet 2

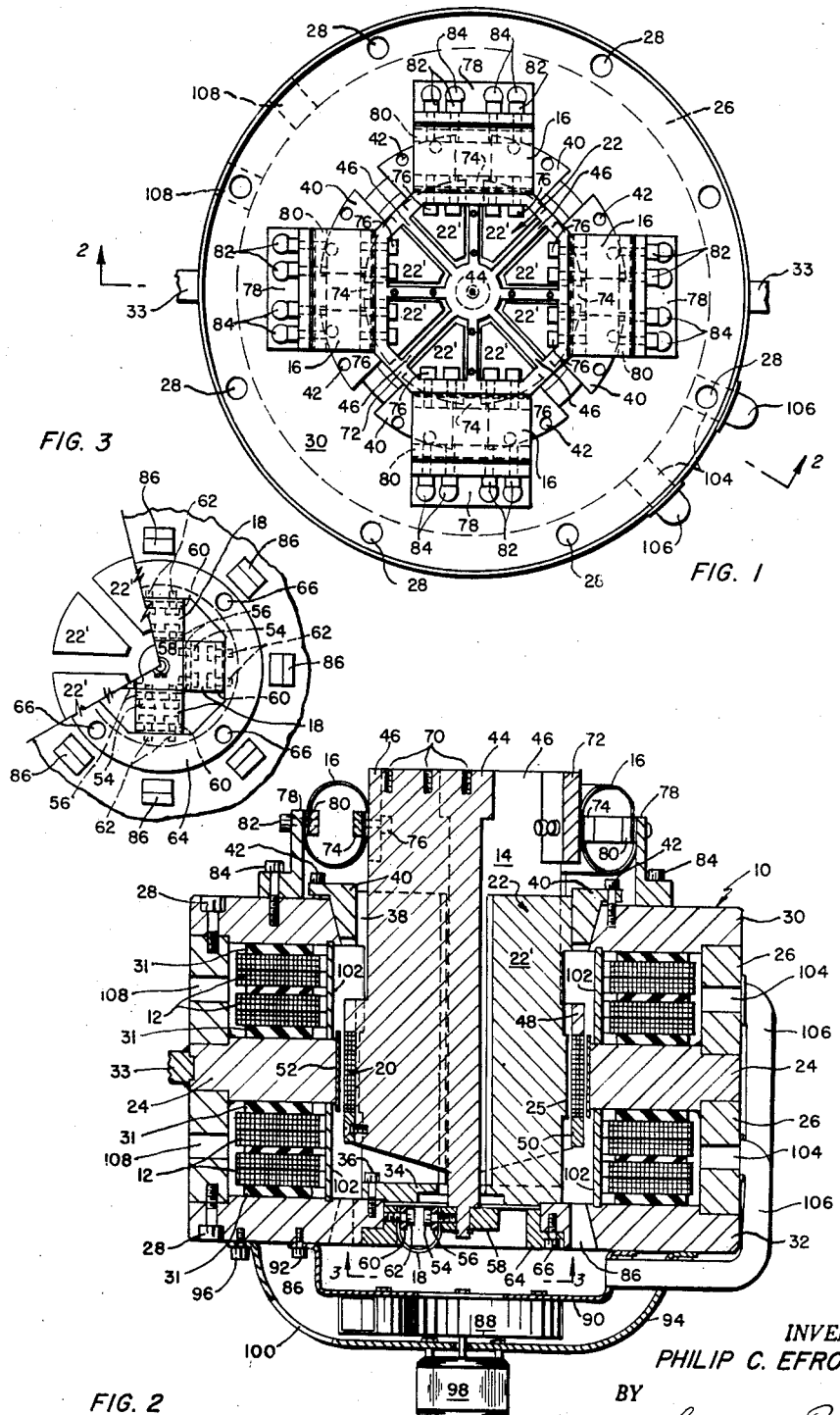

INVENTOR.
PHILIP C. EFROMSON
BY
George W. Price
ATTORNEY 2,925,503
Patented Feb. 16, 1960

2,925,503

VIBRATION TEST APPARATUS

Philip C. Efromson, Winchester, Mass., assignor, by mesne assignments, to The Calidyne Company, Inc., a corporation of Massachusetts Application March 6, 1956, Serial No. 569,940

6 Claims. (Cl. 310—27)

This invention relates to vibration test equipment and more particularly to high load carrying capacity electrodynamic apparatus such as is used in the vibration testing of mechanical structures and electrical components and assemblies.

The principal objects of the present invention are to provide electrodynamic vibration test apparatus which has a large load capacity for its size, which has a rigid armature structure with a relatively low mass, which has an air gap which is magnetically shielded from the load by the core structure, which has means for cooling the armature structure and coil, which has a new and improved type of suspension for the armature and which advances the art generally.

Electrodynamic vibration test equipment according to the present invention comprises a magnetic field circuit including a central pole piece which extends through an aperture in a pole plate a substantially equal distance upon either side of the plate to form a cylindrical air gap. Both ends of the pole piece are connected with the periphery of the pole plate by low reluctance circuit elements, for example, a cylindrical portion having end plates at either end, thereby completing the low reluctance paths of the magnetic circuit. Direct current field windings are disposed about the central pole piece on either side of the pole plate to establish a unidirectional magnetic flux across the air gap. The central pole piece is divided into a plurality of wedge-shaped sectors by radial slots wherein are located the webs of a resiliently mounted armature. In a preferred embodiment, one or more sets of ventilating holes are provided in the elements of the core structure adjacent the central pole piece. The holes are interconnected with a blower so that cooling air is moved along the armature and through the air gap. The flexures for supporting the armature preferably comprise arcuate straps of one or more laminations of a resilient material which are bent in an arc of 180° so that the ends thereof are in parallel relationship to each other. One end of each strap is secured to the armature and the other end to the core structure so that as the armature moves longitudinally the straps deflect linearly as simple cantilevers.

These and other objects and aspects of the invention will be apparent from the following description of a specific embodiment of the invention which refers to a drawing wherein:

Fig. 1 is a plan view;

Fig. 2 is a sectional view on line 2—2 of Fig. 1;

Fig. 3 is a fragmentary bottom view in the direction of arrows 3—3 of Fig. 2;

Figure 4:
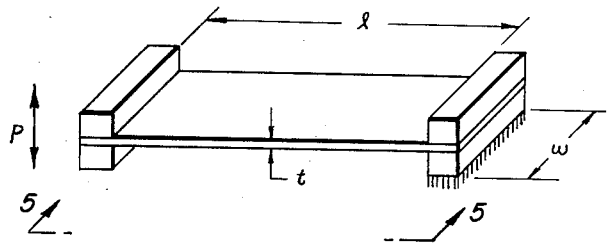
Figs. 4 and 5 are diagrammatic views of a flat spring flexure.

The electrodynamic vibration test apparatus or "shaker" shown in Figs. 1 and 2 comprises a core structure 10 having an air gap across which a unidirectional magnetic flux is established by means of direct current field windings 12. An armature 14 is movably supported by flexures 16 and 18 with the armature coil 20 in the core structure air gap so that as an alternating current flows in the coil, the armature reciprocatingly moves in an axial direction at a frequency corresponding to that of the alternating current.

The core structure 10, which is of a low magnetic reluctance material, such as soft iron, comprises a central pole piece 22 which extends through a circular aperture in a pole plate 24 a substantially equal distance on either side of the plate so that the wall of the aperture in the pole plate and a raised embossment 25 on the periphery of the central pole piece form the cylindrical air gap. The two symmetrical low reluctance paths of the magnetic circuit are completed by a cylindrical portion made up of two rings 26 coaxially disposed with respect to the central pole piece 22 and engaging rabbets in the faces of the pole plate 24. Two end plates 30 and 32 are attached to the opposite outer ends of the rings 26 forming the cylindrical portion by means of bolts 28 thereby to provide two annular cavities wherein the field windings 12 encircling the central pole piece 22 are secured by non-conducting spacers 31. The core structure 10 is supported on trunnions 33 which engage bearings in a base (not shown).

As can best be seen in Fig. 1, the central pole piece 22 is provided with a central aperture radially outwardly from which extend eight slots dividing the pole piece into eight wedge-shaped sectors 22'. The radial slots do not extend the entire length of the central pole piece 22 so that a mounting flange 34 is provided at the bottom thereof. Bolts 36 extend through bolt holes in the flange 34 to engage threaded apertures in the lower end plate 32 thereby to secure the adjacent end of the pole piece 22 thereto. The opposite end of the central pole piece 22 projects into an aperture in the upper end plate 30 having a greater diameter than that of the armature coil 20 so that the armature 14 can be withdrawn therethrough. The gap between the head 38 at the upper end of the central pole piece 22 and the inclined wall of the aperture in the upper end plate 30 is substantially filled by several arcuate spacers 40 which are secured to the plate by bolts 42. As can best be seen in Fig. 2, the spacers 40 have a wedge-shaped cross-section and are made of a low reluctance magnetic material so that there is a minimum of interference with flow of flux in the path of the magnetic circuit. As shown in Fig. 1, the circumferential length of the spacers 40 is made such that a clearance is provided between the ends of adjacent spacers. These clearances act as a set of ventilating holes which aid in the supplying of cooling air for the armature 14 as will be described in detail hereinafter.

As is shown in Figs. 2 and 3, a second set of ventilating holes 86 are provided in the bottom end plate 32 which are interconnected with the inlet of a blower 88 by an inlet casing 90 attached to the plates by screws 92. The blower 88 is enclosed in a second casing 94 secured by screws 96 which also serves as a mounting for the blower motor 98. The casing 94 is provided with an opening 100 through which the discharge from the blower 88 can escape. Each of the core structure cavities wherein are disposed the field windings 12 are isolated by annular baffles 102 of a non-magnetic material, such as aluminum, which serve the dual purpose of, first, acting as structural reenforcement for the core structure 10 and, second, providing a channel along the armature 14 which directs cooling air induced through the upper set of ventilating holes between the spacers 40 by the blower 88 to flow through the air gap. After passing through the air gap the cooling air is exhausted through the lower set of ventilating holes 86 and the casing 90 to the inlet of the blower 88 which discharges the air through the opening 100 in the second casing 94.

The blower 88 is also used to induce the flow of cooling air past the field coils 12. To this end, the blower inlet casing 90 is connected by means of tubing 106 with apertures 104 in the rings 26 forming the cylindrical portion of the core structure 10. Similar diametrically opposed holes 108 which are left open to atmosphere, are also provided in the rings 26 so that the blower 88 induces cooling air to flow through the apertures 108 into the cavities in the core structure 10 where the air is in contact with the field windings 12 and from where it is exhausted through the tubes 106 into the casing 90, to the inlet of blower 88 which discharges through opening 100 in the second casing 94.

The main structure of the armature 14, which is cast or otherwise fabricated of a light weight non-magnetic material such as aluminum, comprises an elongated central member or stem 44 outwardly from which extend eight equally spaced portions such as webs 46 to form a supporting structure or spider which is inserted in the corresponding central aperture and radial slots in the central pole piece 22. The lower ends of the webs 46 are beveled to provide clearance for the heads of the bolts 36. The alternating current coil 20 is bonded to the outer edges of the webs 46, for example by a suitable plastic resin adhesive, between the rings 48 and 50. An annular member 52 which acts as a short-circuited compensating winding is secured to the air gap face of the pole plate 24 to reduce the electrical inductance of the armature 14.

As mentioned heretofore the armature 14 is supported by two sets of flexures 16 and 18. The lower set of flexures 18 comprises four radially disposed, equally spaced, arcuate straps of one or more laminations of a resilient material such as a suitable bronze, tempered steel or plastic resin. The straps are each preformed into an arc of 180° so that the respective ends thereof are in spaced parallel relationship. One end of each strap is clamped by cap screws 54 between a clamping block 56 and a square boss 58 carried on the bottom of the armature 14. The opposite end of each flexure strap is similarly clamped by a block 60 and cap screws 62 to the inner wall of a ring 64. The ring 64 is secured in an aperture in the lower end plate 32 by bolts 66 so that the strap ends clamped thereto are relatively fixed with respect to the core structure 10.

The upper flexures 16, which are connected to the upper end of the armature 14 are not only of heavier construction but are each provided with two straps which are curved in opposite directions to make a complete loop so that the flexures are better able to resist the lateral thrust of the end of the armature to which the test load (not shown) is coupled by means of the threaded apertures 70. To this end the outer edges of the armature webs 46 above the top of the end plate 30 are connected by an integrally cast band or ring 72. This ring is provided with flat spots against which the ends of the two opposed straps of each flexure are attached by a clamping block 74 having threaded apertures for receiving cap screws 76 which project from the inside of the ring through apertures therein. The other ends of the opposed straps of each flexure 16 are fixed to an L-shaped bracket 78 by a clamping block 80 and cap screws 82. The bracket 78 is attached to the top of the end plate 30 by bolts 84.

The advantages to be obtained from the use of flexures similar to those described above will be apparent from the following considerations which necessarily enter into the design and manufacture thereof.

Resonances in the flexure springs of shakers are objectionable because, first, they can produce extremely high stresses in the springs, leading to fracture, and, second, because they can produce reaction forces on the moving armature of the shaker which destroy the desired pure sinusoidal motion of the armature by introducing distorting harmonics.

The effect of flexure resonance can be minimized in various ways. First, the flexures can be so designed as to have no natural vibration modes in the operating frequency range of the shaker. Second, some friction may be introduced into the oscillatory motion of the flexure to prevent large vibrating amplitudes developing at resonances. Third, the flexures can be designed to contain a minimum volume of material to reduce the energy which can be involved in resonances.

With the present day trend toward higher top operating frequencies coupled with the requirement of large armature amplitudes at low frequencies, the first of the above measures becomes extremely difficult or, practically impossible. The second measure is actually employed to some extent either by intention or otherwise, but must be limited because excessive frictional damping of the flexures inevitably results in some damping applied to the basic armature motion, which can be detrimental to the performance of the shaker. The third approach effects the best practical solution to the problem.

The following analysis of a simple flat strap or beam strap such as is shown in Fig. 4 and commonly used heretofore for suspending a shaker armature will serve to show the effect of material reduction. This type of flexure spring is generally clamped at its two ends, to the stationary shaker body structure and to the armature, so that the plane of the flexure is normal to the direction of armature travel. The distance between such clamped portions is known as the length of the flexure; the width is measured normal to the length in the plane of the flexure and is the distance between the free or unclamped edges. For simplicity in design and economy in manufacture, it is most practical to use spring material in strip or sheet form, having a uniform thickness. In the analysis to follow, these flexure dimensions, shown in Figs. 4 and 5, and other parameters involved will be denoted as follows:

$l$ = length
$w$ = width
$t$ = thickness
$E$ = elastic modulus of material
$C_1$, $C_2$, etc. = constants
$k$ = rate of spring
$\Delta$ = deflection of spring
$P$ = applied load to deflect spring
$f_n$ = resonant frequency
$e$ = eccentricity or non-linearity
$r$ = radius of folded flexure For a given application, a spring of a specific rate is required. This rate by definition is:

$$k = \frac{P}{\Delta} \tag{1}$$

In the case of the flat flexure spring, this rate is determined by the product of the elastic modulus, the width, and the cube of the quotient thickness divided by length, or $$k = Ew\left(\frac{t}{l}\right)^3 \tag{2}$$

From this it is seen that the thickness and length may be varied indefinitely without affecting the rate as long as these two dimensions remain in the same proportion one to the other. The volume of material in the flexure, which is $wtl$, can thus be reduced indefinitely without changing the rate; however, it will be seen later that other considerations impose a working limit on such reduction.

Also, the resonant frequencies of the flat flexure spring are determined by equations of the form:

$$f_{n_1} = C_1 \frac{t}{l^2}; \quad f_{n_2} = C_2 \frac{t}{l^2}; \text{ etc.}$$

In the case of conventional materials, the lowest resonant frequency is of the order of:

$$f_{n_1} = 150,000 \frac{t}{l^2} \qquad (3)$$

Now, since these resonances in a spring are normally separated by comparatively wide intervals in the frequency spectrum, it is desirable to arrive at values for $f_n$ which are as high as possible in order that all but one or two of the lowest frequency resonances will occur above the highest operating frequency of the shaker. Increasing the value of $f_n$ is accomplished by decreasing the value of the dimension $l$, as may be seen in Equation 3, assuming that the ratio $$\frac{t}{l}$$

remains constant.

Figure 5:
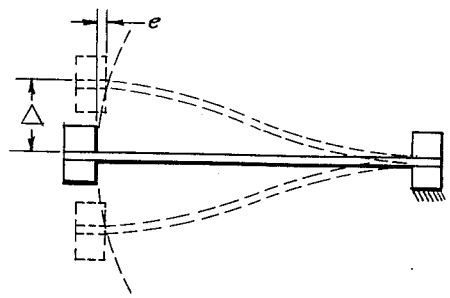

The advantage is gained in two respects by decreasing the dimensions $t$ and $l$. However, physical considerations limit this decrease very sharply. Returning to original design requirements, in addition to a specific spring rate, a finite armature travel is always required; that is, a definite design value is assigned to the deflection $\Delta$ at maximum excursion of the armature from its neutral, or rest, position. Now, from consideration of the form of the deflection of the flat flexure, it can readily be seen that a point on the moving end of the flexure attached to the armature does not traverse a straight line, but rather a curved path as shown in Fig. 5; and the departure of this curve from a straight line increases rapidly as the dimension $l$ approaches a value even several times the value of $\Delta$. This departure is given (to a good degree of approximation) by the equation:

$$e \cong 0.6 \frac{\Delta^2}{l} \qquad (4)$$

Since a basic requirement for a shaker is that the armature travel approach straight-line motion as nearly as possible, and since any lateral component of the armature motion is highly undesirable, inspection of Equation 4 indicates that $l$ must be maintained at a very large value relative to $\Delta$ in order to bring the non-linearity $e$ down to a negligible amount. This consideration limits the reduction of the length dimension and effectively destroys the minimization of resonances by material volume decrease.

Therefore, although the flat flexure has the distinct advantages of extreme simplicity of design and fabrication, and of comparative rigidity against deflection in all directions in the plane of the material, it cannot be used in shakers meeting current standards of operation without complex and troublesome accessory mechanisms to overcome the basic faults of the flexure spring itself.

Figure 6:
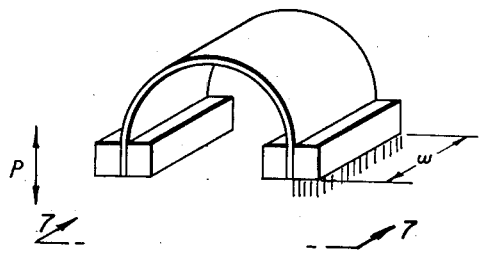
Figs. 6 and 7 are diagrammatic views of a folded spring flexure.
Figure 7:
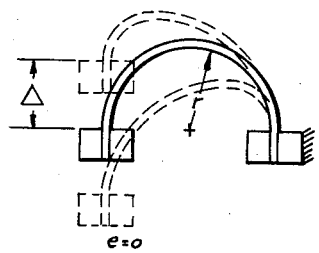

"Folded" flexures, such as 16 and 18, accomplish the desired ends described heretofore while sacrificing a minimum of the advantages inherent in a flat spring flexure. Such "folded" flexures for purposes of analysis may be visualized thus: If a flat flexure as analyzed above, having a width $w$ of generally the same magnitude as the length $l$, be bent into a half-cylinder so that an element lying along length $l$ becomes a semi-circle, the clamped ends remaining parallel to each other and now forming diametrically spaced elements of the cylinder, and if the bent flexure be now relieved of stresses due to this bending so that its free shape is now the semi-cylinder, it has become a folded flexure such as in Fig. 6. This flexure is attached to the stationary structure of the shaker and to the armature by clamping, as before, of portions of the flexure material which extend tangentially from the semi-cylinder; the plane containing the ends of the folded flexure being substantially the same plane which contained the flat flexure previously described; and the motion of the moving end, relative to the stationary end, is such that it is contained in a plane tangential to the (undeformed) semi-cylinder and parallel to the direction of armature travel, at the same time remaining always parallel to the fixed end. Under deformation, the section of the semi-cylinder becomes substantially semi-elliptical, the principal axes of the ellipse being canted or rotated with respect to principal axes of the undeformed section as shown in Fig. 7.

This configuration results in a basic change in characteristics; the flexure is now compliant in two principal directions, i.e., in planes tangential to the semi-cylinder and diametral to the semi-cylinder; and is now comparatively rigid in only one principal direction, i.e., parallel to the cylindrical axis. To obtain positive location of a shaker armature, it is necessary to apply at least three of these folded flexures, preferably disposed symmetrically relative to the circumference of the armature at each end; this distribution of the flexure springs, however, is both simple and desirable from the standpoint of dynamic balance of the armature.

Several advantages have now been gained by adoption of the folded flexure. First, the achievement of compliance in the diametral plane of the semi-cylinder makes it possible for any point in the moving end of the flexure to traverse a straight-line path even when length $l$ of the flexure is reduced until it approaches the same order of magnitude as the deflection $\Delta$. This opens the avenue of approach to substantial diminution of the volume of material in the flexure. The radius $r$ of the cylinder of the folded flexure is $l/\pi$ so that the rate for such configuration is given by the equation:

$$k = 1.65 Ew \left(\frac{t}{l}\right)^3 \qquad (5)$$

Comparing the above equation with Equation 2 for a flat spring flexure it will be apparent that given exactly the same dimensions $l$, $w$, and $t$ for the flat and folded flexures, the rate of the folded flexure is increased approximately 65% over that of the flat, while the maximum fiber stress remains substantially the same for equal deflections in the two configurations. The material is thus being utilized more efficiently, since more energy can be stored at the same stress level; further, for a given rate, less material is required.

Third, again returning to a comparison of flat and folded flexures of identical material dimensions, the lowest frequency resonance is of the order of:

$$f_{n_1} = 300,000 \frac{t}{l^2} \qquad (6)$$

Comparing the above equation with corresponding Equation 3 for a flat spring flexure it will be evident that the frequency of vibration of the lowest frequency resonance encountered will be for the folded flexure, substantially twice that of the flat flexure. Moreover, the lowest order resonance can be effectively damped by permanent, simple means without hampering the operation of the folded flexure; this cannot be done with a flat flexure. Further, the second and other even-numbered resonant modes of the folded flexure are not readily excited by the normal armature motion. Damping of flexure resonances and other structural resonances involving motion of the flexures may be further increased by the building up of the flexure of two or more laminations as shown in Fig. 8. Laminating also provides a means for maintaining maximum lateral stiffness of the suspension for a given normal stiffness which is generally fixed for any specific application.

In operation the armature 14 is coupled to the test load by means of threaded fasteners (not shown) which engage one or more of the threaded apertures 70 in the ends of the armature webs 46, the coupling being facilitated when necessary by the tilting of the core structure 10 about its trunnions 33. The field windings 12 are then energized from a source of direct current such as a motor generator set (not shown) of any of the well known types thereby establishing a strong unidirectional magnetic flux in the iron portions of the magnetic circuit and across the air gap. An alternating current is applied to the armature coil 20, for example, from a variable speed alternator, through flexible leads or slip rings (not shown) in a manner well known to the art. The resulting alternating field surrounding the armature coil 20 interacts with the unidirectional flux across the air gap causing the armature 14 to reciprocate in an axial direction at a frequency corresponding to that of the output of the variable speed alternator.

It should be understood that the present disclosure is for the purpose of illustration only and that this invention includes all modifications and equivalents which fall within the scope of the appended claims.

What is claimed is:

1. Electrodynamic vibration test apparatus for imparting a reciprocating motion to a load comprising a magnetic field circuit including a pole plate having a circular aperture therein, a central pole piece coaxially extending through the aperture a substantially equal distance on either side of the pole plate to form a cylindrical air gap, and low reluctance magnetic circuit elements interconnecting the plate with the respective ends of the pole piece to complete the magnetic circuit, direct current field windings disposed about the central pole piece on either side of the pole plate for establishing a unidirectional magnetic flux across the air gap, said central pole piece being divided into a plurality of wedge-shaped sectors spaced from one another to form a corresponding number of slots which extend outwardly to the periphery of the pole piece, an armature including a supporting structure having means for connecting the load thereto, said supporting structure also having a plurality of outwardly extending portions movably disposed in the respective slots with their outer edges projecting beyond the periphery of the pole piece and an alternating current coil positioned in the air gap and secured to the outer edges of the portions, and flexure means for supporting said armature with freedom of movement in an axial direction while restraining the armature in a radial direction.

2. Electrodynamic vibration test apparatus for imparting a reciprocating motion to a load comprising a magnetic field circuit including a pole plate having a circular aperture therein, a central pole piece with an axial aperture, said central pole piece coaxially extending through the aperture a substantially equal distance on either side of the pole plate to form a cylindrical air gap, and low reluctance magnetic circuit elements interconnecting the plate with the respective ends of the pole piece to complete the magnetic circuit, direct current field windings disposed about the central pole piece on either side of the pole plate for establishing a unidirectional magnetic flux across the air gap, said central pole piece being divided into a plurality of wedge-shaped sectors being spaced from one another to form a corresponding number of slots which extend radially outwardly from the axial aperture to the periphery of the pole piece, an armature including a spider having means for connecting the load thereto, said spider including an elongated central portion positioned in the axial aperture and a plurality of webs radially extending from the elongated portion and located in the respective pole piece slots with their outer edges projecting beyond the periphery of the pole piece, and an alternating current coil positioned in the air gap and secured to the outer edges of the webs, and flexure means for supporting said armature with freedom of movement in an axial direction while restraining the armature in a radial direction.

3. Electrodynamic vibration test apparatus for imparting a reciprocating motion to a load comprising a magnetic field circuit including a pole plate having a circular aperture therein, a central pole piece with an axial aperture, said central pole piece coaxially extending through the aperture a substantially equal distance on either side of the pole plate so that a cylindrical air gap is formed between the wall of the cylindrical aperture in the pole plate and the periphery of the portion of the central pole piece adjacent thereto, a cylindrical low reluctance magnetic portion coaxially disposed with respect to the central pole piece and interconnected with the periphery of the pole plate, and two end plates each joining a respective end of the cylindrical portion with the corresponding end of the central pole piece thereby to complete the magnetic circuit, direct current field windings disposed about the central pole piece and within the cylindrical portion on either side of the pole plate for establishing a unidirectional magnetic flux across the air gap, said central pole piece being divided into a plurality of wedge-shaped sectors spaced from one another to form a corresponding number of slots which extend outwardly to the periphery of the pole piece, an armature including a supporting structure having means for connecting the load thereto, said supporting structure also having a plurality of outwardly extending portions movably disposed in the respective slots with their outer edges projecting beyond the periphery of the pole piece and an alternating current coil positioned in the air gap and secured to the outer edges of the portions, and flexure means for supporting said armature with freedom of movement in an axial direction while restraining the armature in a radial direction.

4. Electrodynamic vibration test apparatus for imparting a reciprocating motion to a load comprising an armature, a magnetic field circuit including a pole plate having a circular aperture therein, a central pole piece with an axial aperture, said central pole piece coaxially extending through the aperture a substantially equal distance on either side of the pole plate so that a cylindrical air gap is formed between the wall of the cylindrical aperture in the pole plate and the periphery of the portion of the central pole piece adjacent thereto, a cylindrical low reluctance magnetic portion coaxially disposed with respect to the central pole piece and interconnected with the periphery of the pole plate, and two end plates each joining a respective end of the cylindrical portion with the corresponding end of the central pole piece thereby to complete the magnetic circuit, direct current field windings disposed about the central pole piece and within the cylindrical portion on either side of the pole plate for establishing a unidirectional magnetic flux across the air gap, said central pole piece being divided into a plurality of wedge-shaped sectors spaced from one another to form a corresponding number of slots which extend outwardly from the axial aperture to the periphery of the pole piece, one end of the sectors being secured to one of the end plates, the other end plate having an aperture therein with a greater diameter than the maximum radial dimension of the armature so that the armature is withdrawable therethrough, a spacer of a low reluctance material interposed in the aperture between the other end plate and the adjacent end of the central pole piece, said armature including a supporting structure having means for connecting the load thereto, said structure having a plurality of outwardly extending portions movably disposed in the respective slots with their outer edges projecting beyond the periphery of the pole piece and an alternating current coil positioned in the air gap and encircling the outer edges of the extending portions, and flexure means for supporting said armature with freedom of movement in an axial direction while restraining the armature in a radial direction.

5. Electrodynamic vibration test apparatus for imparting a reciprocating motion to a coupled load comprising an armature, a magnetic field circuit including a pole plate having a circular aperture therein, a central pole piece with an axial aperture, said central pole piece coaxially extending through the aperture a substantially equal distance on either side of the pole plate so that a cylindrical air gap is formed between the wall of the cylindrical aperture in the pole plate and the periphery of the portion of the central pole piece adjacent thereto, a cylindrical low reluctance magnetic portion coaxially disposed with respect to the central pole piece and interconnected with the periphery of the pole plate, and two end plates each joining a respective end of the cylindrical portion with the corresponding end of the central pole piece thereby to complete the magnetic circuit, direct current field windings disposed about the central pole piece and within the cylindrical portion on either side of the pole plate for establishing a unidirectional magnetic flux across the air gap, said central pole piece being divided into a plurality of wedge-shaped sectors spaced from one another to form a corresponding number of slots which extend outwardly from the axial aperture to the periphery of the pole piece, one end of the sectors being secured to one of the end plates, the other end plate having an aperture therein with a greater diameter than the maximum radial dimension of the armature so that the armature is withdrawable therethrough, a plurality of spacers of a low reluctance material interposed in the aperture between the other end plate and the adjacent end of the central pole piece, the spacers being circumferentially separated from one another to provide a set of ventilating holes for the armature, said armature including a supporting structure having means for connecting the load thereto, said structure having a plurality of outwardly extending portions movably disposed in the respective slots with their outer edges projecting beyond the periphery of the pole piece and an alternating current coil positioned in the air gap and encircling the outer edges of the extending portions, and flexure means for supporting said armature with freedom of movement in an axial direction while restraining the armature in a radial direction.

6. Electrodynamic vibration test apparatus for imparting a reciprocating motion to a load comprising a magnetic field circuit including a pole plate having a circular aperture therein, a central pole piece coaxially extending through the aperture a substantially equal distance on either side of the pole plate to form a cylindrical air gap, and low reluctance magnetic circuit elements interconnecting the plate with the respective ends of the pole piece to complete the magnetic circuit, direct current field windings disposed about the central pole piece on either side of the pole plate for establishing a unidirectional magnetic flux across the air gap, said central pole piece being divided into a plurality of wedge-shaped sectors spaced from one another to form a corresponding number of slots which extend outwardly to the periphery of the pole piece, an armature including a supporting structure having means for connecting the load thereto, said supporting structure also having a plurality of outwardly extending portions movably disposed in the respective slots with their outer edges projecting beyond the periphery of the pole piece and an alternating current coil positioned in the air gap and secured to the outer edges of the portions, and means for supporting said armature with freedom of movement in an axial direction while restraining the armature in a radial direction.

References Cited in the file of this patent

UNITED STATES PATENTS

| | | |
|---|---|---|
| 1,797,253 | Weyandt | Mar. 24, 1931 |
| 1,821,586 | Smythe | Sept. 1, 1931 |
| 2,210,692 | Stokes | Aug. 6, 1940 |
| 2,231,675 | Lynn | Feb. 11, 1941 |
| 2,336,930 | Dyer | Dec. 14, 1943 |
| 2,403,034 | Weyandt et al. | July 2, 1946 |
| 2,596,048 | Severs | May 6, 1952 |
| 2,705,761 | Unholz | Apr. 5, 1955 |
| 2,846,598 | Zerigian | Aug. 5, 1958 |